Sept. 6, 1932.  J. J. PUNKE  1,876,165
STEERING WHEEL CAP ASSEMBLY
Filed July 22, 1929  2 Sheets-Sheet 1

INVENTOR
John J. Punke

Sept. 6, 1932. J. J. PUNKE 1,876,165
STEERING WHEEL CAP ASSEMBLY
Filed July 22, 1929 2 Sheets-Sheet 2
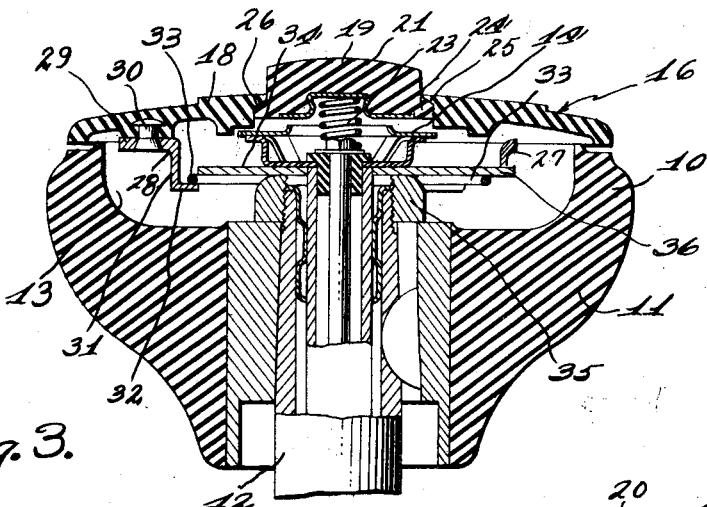
Fig. 3.
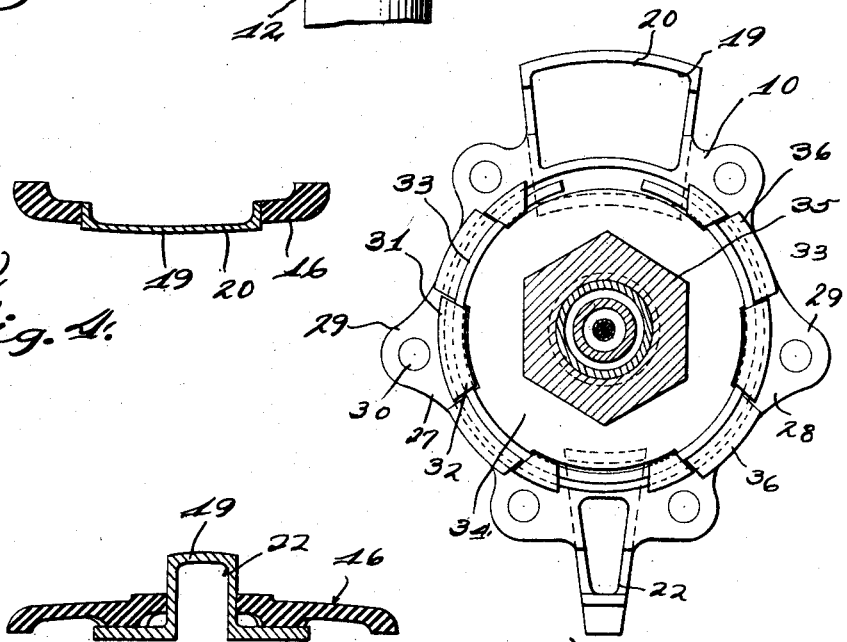
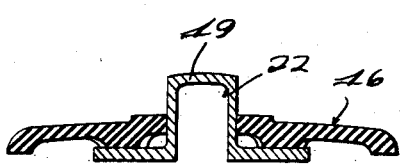
Fig. 4.
Fig. 5.
Fig. 6.
INVENTOR
John J. Punke
BY
*Whittemore Hulbert Whittemore Belknap*
ATTORNEYS Patented Sept. 6, 1932

1,876,165

UNITED STATES PATENT OFFICE

JOHN J. PUNKE, OF DETROIT, MICHIGAN, ASSIGNOR TO HUPP MOTOR CAR CORPORATION, OF DETROIT, MICHIGAN, A CORPORATION OF VIRGINIA

STEERING WHEEL CAP ASSEMBLY

Application filed July 22, 1929. Serial No. 380,221.

This invention relates to a combined push button and control lever assembly adapted to be mounted upon the steering wheel of a vehicle for convenient manipulation by the operator and has as one of its objects to simplify, render more efficient and improve generally devices of this character.

Another object of this invention is to enhance the general appearance of the steering wheel by providing a combined push button and control lever assembly simulating in appearance a one piece cap for the steering wheel.

A further object of this invention is to provide an assembly of the foregoing character wherein the push button in addition to being depressible for performing its usual function of actuating a switch within the steering wheel is also capable of being actuated to rotate the assembly as a unit for operating still another switch within the steering wheel.

With the foregoing, as well as other objects in view, the invention resides in the construction and arrangements of parts to be more fully hereinafter described.

In the drawings:

Figure 3 is a sectional view taken on the line 3—3 of Figure 1.

Figure 4 is a sectional view taken on the line 4—4 of Figure 1.

Figure 5 is a sectional view taken on the line 5—5 of Figure 1; and

Figure 6 is a sectional view taken on the line 6—6 of Figure 2.

Figure 1:
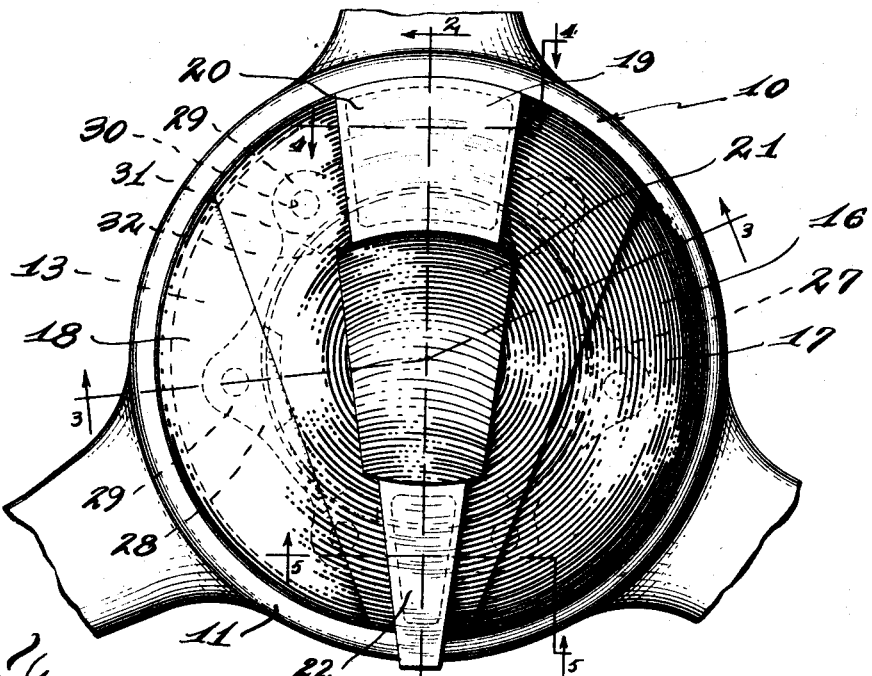
Figure 1 is a fragmentary top plan view of a steering wheel equipped with a cap constructed in accordance with this invention.

Referring now to the drawings, it will be noted that there is illustrated fragmentarily in Fig. 1 a steering wheel 10 having a hub 11 secured in any suitable manner to the steering column 12 and having a recess 13 formed in the upper face thereof. Arranged within the recess 13 is a pair of switches illustrated generally by the reference characters 14 and 15 and which may be of any suitable construction. The switch 14 preferably, although not necessarily, controls the operation of the conventional horn on the vehicle and the switch mechanism 15 preferably controls the lights upon the vehicle.

For actuating the switches 14 and 15 and at the same time concealing the same, I provide a cap assembly 16 rotatably mounted upon the hub 11. The cap assembly 16 is preferably circular in contour and comprises a pair of laterally spaced segmental sections 17 and 18 having the inner edges thereof snugly engaging opposite sides of the wedge shaped control lever 19. The control lever 19 preferably projects above the top surface of the cap and is formed of three sections, 20, 21 and 22. The sections 20 and 22 are preferably channel-shaped in cross section and are formed of metal while the remaining sections of the cap are preferably formed of bakelite or some similar material. With an arrangement of this character, various color schemes may be worked out to enhance the general appearance of the device. For example, the sections 17, 18 and 21 may be formed of a black material while the metallic sections 20 and 22 may be nickel plated if desired, thus giving the entire assembly a neat and attractive appearance.

Figure 2:
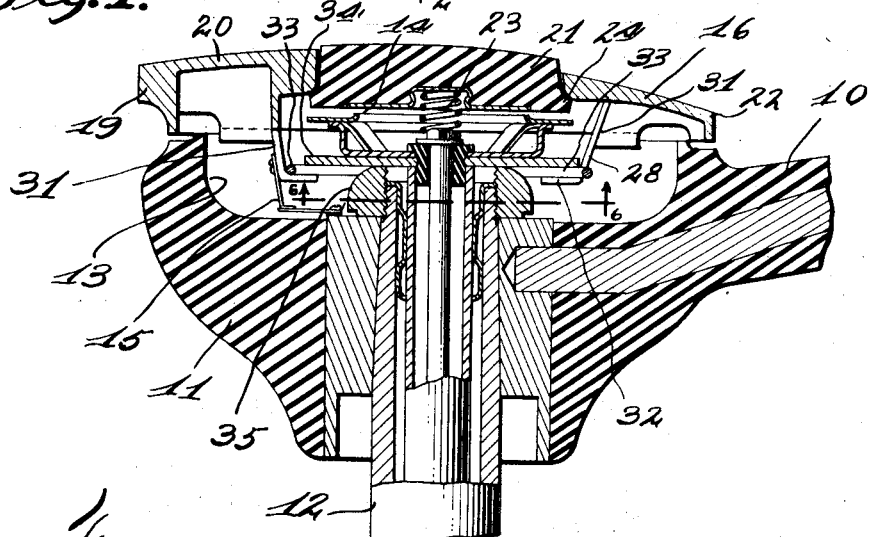
Figure 2 is a sectional view taken on the line 2—2 of Figure 1.

The central section 21 of the control lever in addition to being capable of rotation as a unit with the cap is also capable of being depressed to actuate the switch 14. As shown particularly in Figures 2 and 3, the button or central section 21 is normally maintained in inoperative position by virtue of the spring 23 tending to urge the button upwardly to engage the marginal edges 24 thereof with the correspondingly shaped inner edges 25 and 26 of the segments 17 and 18 respectively. As stated above, the button 21 is not capable of rotation relative to the remaining sections of the cap so that it forms a convenient gripping portion for rotating the entire assembly to actuate the switch 15. As shown particularly in Figure 1, all of the sections of the cap cooperate with each other in such a manner as to simulate in effect a one piece cap construction.

For securing the sections 17, 18, 20 and 22 of the cap together to form a unitary construction and at the same time to detachably secure the cap to the steering wheel, I provide the following construction. As shown in Figures 3 and 6, the metallic sections 20 and 22 are connected together by means of the webs 27 and 28 which as shown are preferably cast integrally with the sections 20 and 22. The web members 27 and 28 are provided with laterally projecting ears 29 adapted to be secured to the sections 17 and 18 by means of the rivets 30 and are further provided at circumferentially spaced points with depending arms 31 terminating in laterally projecting fingers 32. The fingers 32 form seats for a resilient locking ring 33 and are adapted to support the latter below a plate 34 secured to the steering post by means of the nut 35. The plate 34 is provided with a plurality of spaced radially projecting lugs 36 adapted to extend over the resilient ring 33 and engage the portions of the webs 27 and 28 intermediate the depending lugs 31. Thus it will be apparent that the web members 27 and 28, in addition to securing the sections 17, 18, 20 and 22 of the cap together to form a unitary construction, are also instrumental in detachably securing the cap assembly to the steering column.

Thus from the foregoing it will be noted that I have provided a control assembly for steering wheels which is not only neat and attractive, in appearance, but which may be economically manufactured, assembled, and installed.

What I claim as my invention is:

1. In a device of the class described, the combination with a steering wheel having a hub portion and a plurality of circuit controlling switches, of a cap formed of a plurality of sections rotatable as a unit upon the hub portion to actuate one of the switches, one of said sections operable independent of the other sections for actuating another of said switches.

2. In a device of the class described, the combination with a steering wheel having a hub portion and a plurality of circuit controlling switches, a cap for said hub portion comprising a pair of laterally spaced substantially flat segmental sections, and a control lever arranged between the sections for rotating the cap to actuate one of the switches, said control lever having a central depressible section operatively connected to another of the switches for actuating the same.

3. In a device of the class described, a steering wheel, a cap assembly for said steering wheel comprising a control lever formed of spaced sections and a central depressible section, means for securing said spaced sections together as a unit, and a pair of substantially flat segments positioned upon opposite sides of said sections and secured to the means aforesaid, said segments cooperating with the remaining sections to form the cap.

4. In a device for the class described, a steering wheel, a cap assembly for said steering wheel comprising a control lever formed of spaced sections and a central depressible section, means for securing said spaced sections together, a series of segments carried by the means aforesaid and cooperating with said sections to form the cap, and means also carried by said first mentioned means for detachably securing the cap to said steering wheel.

5. In a device of the class described, a steering wheel having a plurality of switches associated therewith, a sectional cap rotatably mounted upon said wheel and comprising a control lever formed of spaced sections and a central section depressible to actuate one of said switches, web members connecting said spaced sections, segments upon opposite sides of the control lever secured to the web members and cooperating with the sections aforesaid to form the cap, and means carried by the web members for securing the cap to the steering wheel.

6. A cap assembly for steering wheels comprising, spaced sections rotatable as a unit relative to the wheel for controlling an electric circuit, means for securing the sections together, another section located within the space between the sections aforesaid and depressible for controlling a circuit other than the one previously set forth and still other sections located on opposite sides of the sections aforesaid cooperating with the latter to form the cap and secured as a unit to said first-named sections by the securing means aforesaid.

7. A cap assembly adapted to be rotatably mounted upon a steering wheel for controlling an electric circuit, comprising a pair of substantially flat segmental portions having the adjacent edges thereof spaced from each other, a second pair of sections arranged in spaced relation between the edges aforesaid and disposed in a different plane than said segmental portions, a section located within the space defined by the latter sections and segmental portions aforesaid and depressible for controlling a circuit other than the one previously set forth, and means connecting the above-mentioned sections also serving as anchorage means for the segmental portions.

In testimony whereof I affix my signature.

JOHN J. PUNKE.